(12) United States Patent
Mihailov et al.

(10) Patent No.: US 7,689,087 B2
(45) Date of Patent: Mar. 30, 2010

(54) METHOD OF CHANGING THE BIREFRINGENCE OF AN OPTICAL WAVEGUIDE BY LASER MODIFICATION OF THE CLADDING

(75) Inventors: Stephen J. Mihailov, Kanata (CA); Dan Grobnic, Ottawa (CA); Christopher W. Smelser, Ottawa (CA); Robert B. Walker, Spencerville (CA); Ping Lu, Kanata (CA); Xiaoli Dai, Kanata (CA); Huimin Ding, Nepean (CA); Gino Cuglietta, Kanata (CA)

(73) Assignee: Her Majesty the Queen in right of Canada, as represented by the Minister of Industry, Through the Communications Research Centre Canada, Ottawa (CA)

( * ) Notice: Subject to any disclaimer, the term of this patent is extended or adjusted under 35 U.S.C. 154(b) by 113 days.

(21) Appl. No.: 12/169,920

(22) Filed: Jul. 9, 2008

(65) Prior Publication Data

US 2008/0310789 A1 Dec. 18, 2008

Related U.S. Application Data

(63) Continuation-in-part of application No. 11/683,070, filed on Mar. 7, 2007, now Pat. No. 7,515,792, and a continuation-in-part of application No. 11/243,193, filed on Oct. 5, 2005, now Pat. No. 7,379,643, which is a continuation-in-part of application No. 11/104,545, filed on Apr. 13, 2005, now abandoned, and a continuation-in-part of application No. 10/803,890, filed on Mar. 19, 2004, now Pat. No. 7,031,571, and a continuation-in-part of application No. 10/639,486, filed on Aug. 13, 2003, now Pat. No. 6,993,221.

(60) Provisional application No. 60/780,870, filed on Mar. 10, 2006, provisional application No. 60/561,882, (Continued)

(30) Foreign Application Priority Data

| Aug. 1, 2003 | (CA) | .................... 2436499 |
| Nov. 26, 2003 | (EP) | .................. 03405845 |
| Mar. 19, 2004 | (CA) | .................... 2461368 |
| Mar. 22, 2004 | (EP) | .................. 04405172 |

(51) Int. Cl.
*G02B 6/10* (2006.01)

(52) U.S. Cl. .................. 385/129; 385/37; 385/124; 385/10

(58) Field of Classification Search ............. 385/129, 385/10, 124–127, 141–145, 39

See application file for complete search history.

(56) References Cited

U.S. PATENT DOCUMENTS 4,807,950 A 2/1989 Glenn et al.

(Continued)

FOREIGN PATENT DOCUMENTS

CA 2461368 9/2004

(Continued)

OTHER PUBLICATIONS

P. J. Lemaire et al. In *Electron. Lett.* vol. 29, No. 13, pp. 1191-1193 (1993).

(Continued)

*Primary Examiner*—Ellen Kim
(74) *Attorney, Agent, or Firm*—Teitelbaum & MacLean; Neil Teitelbaum; Doug MacLean

(57) ABSTRACT

A method of inducing birefringence in an optical waveguide is disclosed wherein the waveguide cladding is irradiated with energy of a sufficient intensity so as to induce a stress in the optical waveguide so as to cause a multitude of spaced stress induced regions within the cladding of the optical waveguide such that there are 10 to 5000 spaced regions per mm and wherein the stress induced regions are proximate the core greater than 2 microns distance from the core-cladding interface. This waveguide has numerous uses, for example a fiber sensor.

16 Claims, 12 Drawing Sheets

Related U.S. Application Data filed on Apr. 14, 2004, provisional application No. 60/616,838, filed on Oct. 8, 2004, provisional application No. 60/634,547, filed on Dec. 10, 2004, provisional application No. 60/545,949, filed on Feb. 20, 2004, provisional application No. 60/456,184, filed on Mar. 21, 2003.

(56) References Cited

U.S. PATENT DOCUMENTS

| | | |
|---|---|---|
| 5,111,326 A | 5/1992 | Ball |
| 5,237,576 A | 8/1993 | DiGiovanni et al. |
| 5,287,427 A | 2/1994 | Atkins et al. ............... 385/124 |
| 5,367,588 A | 11/1994 | Hill et al. ....................... 430/5 |
| 5,381,229 A | 1/1995 | Murphy et al. |
| 5,455,835 A | 10/1995 | Atkins |
| 5,495,548 A | 2/1996 | Bilodeau et al. ............ 385/123 |
| 5,511,083 A | 4/1996 | D'Amato et al. |
| 5,620,496 A | 4/1997 | Erdogan et al. |
| 5,627,933 A | 5/1997 | Ito et al. |
| 5,790,726 A | 8/1998 | Ito et al. |
| 5,978,538 A | 11/1999 | Miura et al. ................ 385/123 |
| 6,005,999 A | 12/1999 | Singh et al. |
| 6,009,222 A | 12/1999 | Dong et al. |
| 6,104,852 A | 8/2000 | Kashyap |
| 6,204,926 B1 | 3/2001 | Maznev et al. |
| 6,221,555 B1 | 4/2001 | Murakami et al. |
| 6,236,782 B1 | 5/2001 | Kewitsch et al. |
| 6,282,016 B1 | 8/2001 | MacCormack et al. |
| 6,289,699 B1 | 9/2001 | Kewitsch et al. .............. 65/406 |
| 6,297,894 B1 | 10/2001 | Miller et al. |
| 6,347,171 B1 | 2/2002 | Tatah et al. ................... 385/37 |
| 6,351,588 B1 | 2/2002 | Bhatia et al. |
| 6,385,369 B1 | 5/2002 | Hill et al. |
| 6,465,153 B1 | 10/2002 | Kewitsch et al. |
| 6,516,118 B1 | 2/2003 | Brilland et al. |
| 6,573,026 B1 | 6/2003 | Aitken et al. ................ 430/290 |
| 6,578,388 B1 | 6/2003 | Kewitsch et al. |
| 6,600,149 B2 | 7/2003 | Schulz et al. |
| 6,628,850 B1 * | 9/2003 | Yao .............................. 385/10 |
| 6,628,877 B2 | 9/2003 | Dugan et al. |
| 6,633,419 B2 | 10/2003 | Hosono et al. |
| 6,768,850 B2 | 7/2004 | Dugan et al. ................ 385/124 |
| 6,920,272 B2 * | 7/2005 | Wang .......................... 385/129 |
| 6,941,052 B2 | 9/2005 | Viswanathan et al. ....... 385/123 |
| 6,993,221 B2 | 1/2006 | Mihailov et al. |
| 7,031,571 B2 | 4/2006 | Mihailov et al. |
| 7,095,931 B2 | 8/2006 | Sezerman et al. |
| 7,155,074 B2 * | 12/2006 | Kersey ......................... 385/12 |
| 7,295,731 B2 | 11/2007 | Sezerman et al. |
| 7,379,643 B2 | 5/2008 | Mihailov et al. |
| 2004/0047039 A1 * | 3/2004 | Wang et al. ................. 359/487 |
| 2004/0120643 A1 | 6/2004 | Viswanathan et al. ........ 385/37 |
| 2004/0184734 A1 | 9/2004 | Mihailov et al. .............. 385/37 |

FOREIGN PATENT DOCUMENTS

| | | |
|---|---|---|
| EP | 0 435 201 B | 7/1991 |
| EP | 0 668 514 B | 8/1995 |
| EP | 1 291 985 A | 3/2003 |
| EP | 1 460 459 | 9/2004 |
| EP | 1462831 | 9/2004 |
| WO | WO 97/15851 A | 5/1997 |
| WO | WO 01/35136 | 5/2001 |

OTHER PUBLICATIONS

K.M. Davis et al. "Writing Waveguides in Glass with a Femtosecond Laser" Opt. Letts, vol. 21, Nov. 21, 1996 pp. 1729-1731 (1996).

M. Svalgaard and M. Kristensen in "Directly UV written silica-on-silicon planar waveguides with low loss," Electron. Lett., vol. 33, No. 10, pp. 861-863, 1997.

M. Svalgaard, "Direct writing of planar waveguide power splitters and directional couplers using a focused ultraviolet laser beam," Electron. Lett., vol. 33, No. 20, pp. 1694-1695, 1997.

C. Dalle, Patrick Cordier, C. Depecker, P. Niay, P. Bernage, and M. Douay, "Growth kinetics and thermal annealing of UV-induced H-bearing species in hydrogen loaded germanosilicate fibre preforms," Journal of Non-Crystalline Solids, vol. 260, No. 1-2, pp. 83-98, 1999).

L. Sudrie, M. Franco, B. Prade, and A. Mysyrowicz, "Study of damage in fused silica induced by ultra-short IR laser pulses," Opt. Comm., vol. 191, No. 3-6, pp. 333-339, 2001.

Takada and Abe "Slab-waveguide irradiation of uv laser light for photosensitive phase error compensation of arrayed-waveguide gratings," IEEE Photon. Tech. Lett., vol. 14, No. 6, pp. 813-815, 2002.

C. W. Smelser, S. J. Mihailov, and D. Grobnic, entiltled "Hydrogen loading for fiber grating writing with a femtosecond laser and a phase mask," Opt Lett., vol. 29, No. 18, pp. 2127-2129, 2004.

C. W. Smelser, S. J. Mihailov, and D. Grobnic, "Formation of Type I-IR and Type II-IR gratings with an ultrafast IR laser and a phase mask," Opt. Exp., vol. 13, No. 14, pp. 5377-5386, 2005.

Love et al, "Tapered Single-Mode Fibres and Devices", IEEE Proceedings, Journal vol. 138, No. 5, pp. 343-354.

"Fabricating in Fiber Gratings in Single Crystal Sapphire Fiber", Nam et al, Components and Materials, Proceedings of SPIE Optical, vol. 5350, Jan. 26, 2004, pp. 58-59 and 61-63.

"Sapphire Fiber Bragg Grating Sensor Made Using Femotosecond Laser Radiation for Ultrahigh Temperature Applications", Grobnic et al, IEEE Photonics Tech. Ltrs, vol. 16, No. 11, Nov. 2004, pp. 2505-2507.

"Bragg Gratings Written in All-SiO2 and Ge-Doped Core Fibers with 800-nm Femtosecond Radiation and a Phase Mask", Mihailov et al, Journal of Lightwave Technology, vol. 22, No. 1 Jan. 1, 2004.

"Growth of High-quality Y2 O3-ZrO2 Single Crystal Optical Fibers for Ultra-high-temperature Fiber-optic Sensors", Tong, Journal of Crystal Growth vol. 217, No. 3, Aug. 1, 2000, pp. 281-286.

"Wavelength Demodulated Bragg Grating Fiber Optic Sensing Systems for Addressing Smart Structure Critical Issues", Measures et al, Smart Materials and Structures, No. 1. No. 1, Mar. 1, 1992.

Mihailov et al, "Fabrication of fiber bragg gratings (FBG) in all-$SiO_2$ and Ge-doped core fibers with 800 nm picosecond radiation" Optical Society of America, 2003.

Dyer et al, "Analysis of grating formation with excimer laser irradiated phase masks", Optics Comm. 115 (1995) vol. 115, pp. 327-334.

Mills et al, "Imaging of free-space interference patterns used to manufacture fiber bragg gratings", Applied Optics, vol. 39, pp. 6128-6135 (Nov. 2000).

Mizrahi et al, J. Lightwave Technol. 11 (12), pp. 2021-2025 (1993).

Kreger et al, Proceedings of the Optical Fiber Sensors Conference (OFS 15) 2002, pp. 355-358.

Erdogan et al, J. Opt. Soc. Am. B, 11 (10), pp. 2100-2105, 1994.

Vengsarkar et al, Opt. Lett. 19 (16) pp. 1260-1262, 1994.

Bricchi et al, Opt. Lett. 29 (1), pp. 119-121 (2004).

Glezer et al, Appl. Phys. Lett. 71 (24), pp. 882-884 (1997).

Dürr et al, Appl. Phys. Lett 84 (24), pp. 4983-4985 (2004).

M. Dubov et al, OWI50 of the Proceedings of the Optical Fiber Communications Conference, (2006).

Lai et al, Opt. Lett. 31 (11), pp. 1672-1674, 2006.

Mihailov et al, Proceedings of the Bragg Gratings, Photosensitivity and Poling in Glass Waveguides Conference BGPP2003, pp. 194-196, 2003.

Bhardwaj et al, Opt. Lett. 29 (12), pp. 1312-1314, 2004.

Grobnic et al, Meas. Sci. Technol. 17 (5), p. 1009-1013 (2006).

* cited by examiner

METHOD OF CHANGING THE BIREFRINGENCE OF AN OPTICAL WAVEGUIDE BY LASER MODIFICATION OF THE CLADDING

CROSS-REFERENCE TO RELATED APPLICATIONS

The present application is a continuation-in-part of U.S. patent application Ser. No. 11/683,070 filed Mar. 7, 2007, now U.S Pat. No. 7,515,792 which claims priority from U.S. patent application Ser. No. 60/780,870 filed Mar. 10, 2006, which are incorporated herein by reference for all purposes.

U.S. patent application Ser. No. 11/683,070 is also a continuation-in-part of U.S. patent application Ser. No. 11/243,193 filed Oct. 5, 2005, now issued as U.S. Pat. No. 7,379,643, which is a continuation-in-part of U.S. patent application Ser. No. 11/104,545 filed on Apr. 13, 2005, now abandoned, which claims priority from U.S. patent application Ser. No. 60/561,882 filed Apr. 14, 2004; U.S patent application Ser. No. 60/616,838 filed Oct. 8, 2004 and from U.S patent application Ser. No. 60/634,547 filed Dec. 10, 2004, and which is a continuation-in-part of U.S. patent application Ser. No. 10/803,890 filed Mar. 19, 2004, now issued as U.S. Pat. No. 7,031,571, which claims priority from U.S patent application Ser. No. 60/545,949 filed Feb. 20, 2004; Canadian patent application 2,436,499 filed Aug. 1, 2003 and European patent application 03405845.3 filed Nov. 26, 2006, and which is a continuation-in-part of U.S. patent application Ser. No. 10/639,486 filed Aug. 13, 2003, now issued as U.S. Pat. No. 6,993,221, which claims priority from U.S. patent application Ser. No. 60/456,184 filed Mar. 21, 2003, which are incorporated herein by reference for all purposes.

U.S. patent application Ser. No. 11/243,193 also claims priority from Canadian patent application 2,461,368 filed Mar. 19, 2004 and from European patent application 04405172 filed Mar. 22, 2004, which are incorporated herein by reference for all purposes.

BACKGROUND OF THE INVENTION

Optical fibers are used in many fields including telecommunications, laser machining and welding, laser beam and power delivery, fiber lasers, sensors and medical diagnostics and surgery. They are typically made entirely from solid transparent materials such as glass and each fiber typically has the same cross-sectional structure along its length. The transparent material in one part (usually the middle) of the cross-section has a higher refractive index than the rest and forms an optical core within which light is guided by total internal reflection. We refer to such a fiber as a standard fiber.

Although the light is confined to the core in a standard fiber, the cladding plays an active part in the wave-guiding process because a guided mode will extend some distance into the cladding. The cladding is also important for a relatively new class of fiber devices, know as cladding-pumped fiber lasers and amplifiers. The fibers used in such devices have an inner core, in which signal light propagates single-mode, and which is doped with some active material, typically a rare earth element. The inner core is nested in a larger outer core, which is multimode at both signal and pump wavelengths. Typically, the inner core is nested off-center within the outer core, to improve the overlap between the core mode and the modes of the cladding. High-power multi-mode pump light can be introduced into the outer core with a high efficiency, and propagates down the fiber, being gradually absorbed by the rare earth element present in the inner core. The signal in the inner core is then amplified, forming an optical amplifier or, with appropriate feedback, a laser.

As most optical signals propagating through an optical fiber based network have an arbitrary polarization state, it is often preferred that optical components integrated into the optical network be substantially polarization insensitive. Planar waveguides usually have different propagation constants for TE (transverse electric) and TM (transverse magnetic) waveguide modes that are known to be polarization sensitive, that is the response of the waveguide differs for orthogonally polarized light beams. The difference in refractive index of the waveguide seen by the different polarizations of the optical signal result in a wavelength splitting of the signal. This wavelength splitting is defined as the birefringence of the waveguide.

There are a number of applications where a given amount of birefringence in an optical fiber or waveguide is desirable, among the most important being the single polarization fiber lasers as described by Mizrahi et al. in *J. Lightwave Technol.* 11 (12), pp. 2021-2025 (1993), where higher output powers can be realized if the gain in the resonator cavity of the laser couples into a single polarization state rather than into two states of polarization. The short cavity fiber laser as described by Mizrahi et al. is obtained by inscribing Bragg gratings directly into the core of the Erbium and Germanium-doped active fiber, to act as the laser cavity mirrors. Typically single polarization lasers require complicated design incorporating polarization maintaining fiber and bulk optics such as Faraday rotators as taught for example by MacCormack et al. in U.S. Pat. No. 6,282,016.

Another application where a given amount of waveguide birefringence is desirable is for sensing using fiber Bragg gratings as described by Kreger et al. in the *Proceedings of the Optical Fiber Sensors Conference* (OFS 15) 2002, pg 355-358 and taught by Schulz et al. in U.S. Pat. No. 6,600,149 where a grating written onto birefringent optical fiber generates two spectral peaks that are reflected in the absence of a load. As the grating written onto birefringent fiber is transversely loaded, the spacing between the two spectral peaks will change. This variation in spacing can be used to monitor pressure, while the simultaneous wavelength shift of the two spectral peaks can be used to monitor temperature. In this fashion, an intrinsic fiber grating sensor can be created which can simultaneously monitor temperature and pressure.

Typically, the designs of the highly birefringent fibers used in the above applications are complex, often requiring the incorporation of rods of dissimilar materials along the fiber axis in order to generate internal stresses that are local to the guiding core region. It is well know that such localized internal stress in glass fiber optics leads to optical birefringence in and around the stressed region. Birefringence in optical fiber can also be photoinduced by locally processing the optical substrate with high energy laser pulses. Small amounts of birefringence ($4 \times 10^{-5}$) can be created by UV exposure of UV photosensitive fibers cores as described by Erdogan et al. in *J. Opt. Soc. Am. B*, 11 (10), pp. 2100-2105, 1994 when the polarization of the UV source is normal to the waveguide axis. The birefringence can be minimized if the induced index change is symmetric about the waveguide core as described by Vengsarkar et al. in *Opt. Lett.* 19 (16), pp. 1260-1262, 1994.

The relatively new field of femtosecond laser processing is potentially better suited to induce birefringence in optical materials. There are a number of reports that suggest that the femtosecond induced refractive index in dielectric materials such as fused silica is intrinsically birefringent where the refractive index change along the axis of the polarization of the writing beam is larger than along the orthogonal direction, an effect associated with the creation of a periodic nanostructure as described by Bricchi et al. in *Opt. Lett.* 29 (1), pp. 119-121 (2004). At higher intensities, Glezer et al. in *Appl. Phys. Lett.* 71 (24), pp. 882-884 (1997) describe that multiphoton absorption of femtosecond pulse duration IR radiation within the glass forms a hot high-density electron plasma during the duration of the laser pulse generating temperatures up to ~$10^6$ Kelvin, however the optical excitation of the plasma ends before the surrounding lattice structure of the glass is disturbed. A micro-explosion occurs within the glass due to of the super heated plasma that forms a void surrounded by densified material. Dürr et al. in *Appl. Phys. Lett.* 84 (24), pp. 4983-4985 (2004) presented tomographic measurements of Ge-doped SMF-28 telecommunication fiber cores that were exposed to femtosecond pulse duration infrared laser pulses below intensity levels needed to induce multiphoton ionization of the material. They showed that in the regions of the optical fiber exposed to the laser, increased levels of induced stress were observed. Birefringent long period gratings were also written in single mode fiber by placing the grating off center of the core of the fiber as was described by M. Dubov et al. in paper OWI50 of the *Proceedings of the Optical Fiber Communications Conference*, (2006). The levels of birefringence produced were ~$2\times10^{-5}$.

Fiber Bragg gratings (FBG) written uniformly across the core of single mode fibers with femtosecond infrared (IR) radiation and a phase mask as taught by Mihailov et al. in U.S. Pat. Nos. 6,993,221 and 7,031,571 typically produce low levels of birefringence (~$10^{-5}$) that do not generate large polarization dependent wavelength shifts (PDW) or polarization dependent loss (PDL). FBGs written in the cores of Er:Yb-codoped phosphosilicate fiber with femtosecond lasers and the point-by-point technique were used to create a fiber laser as described by Lai et al in *Opt. Lett.* 31 (11), pp. 1672-1674, 2006. The FBGs were birefringent as a result of the index modulation being highly localized to one side of the fiber core. The levels of birefringence produced were ~$4\times10^{-5}$.

Femtosecond exposure of the waveguide cladding region in proximity of the waveguide core could potentially generate enough birefringence to allow a photo-induced Bragg grating written in the core region to have a birefringent response. For applications such as high power, short cavity lasers, which utilize complex active fiber design architectures, the capability of locally inducing large birefringence would relax design requirements of the active fiber allowing a non-birefringent fiber design to be used instead of a specialty high birefringent fiber design. Some applications not only require the separation of orthogonal polarization but the cancellation or reduction of one of the polarization states as well. This function is usually performed by single polarization fibers that require a relatively large propagation length before a substantial cancellation of one polarization is obtained. In U.S. Pat. No. 5,511,083 for example, D'Amato et al. teach a technique for producing a single polarization fiber laser source by inducing a blazed or tapped grating within the resonator cavity of a fiber laser. The tapped grating out couples one state of polarization within the cavity through radiation mode coupling thus reducing one of the states of polarization within the laser cavity.

In U.S. Pat. No. 7,095,931 Sezerman et al. teach a technique for inducing a birefringence in an optical fiber cladding with a femtosecond laser by applying a transverse stress to the fiber during the exposure of the cladding to high intensity femtosecond pulse duration infrared radiation, the intensity being sufficient enough to induce multiphoton ionization and melting of the glass. Upon release of the stress, the memory of stress remains in the exposed region of the cladding producing a birefringence. It is our understanding that these techniques taught by Sezerman et al. have not been reduced to practice so the amounts of induced birefringence possible with this technique are unknown.

The prior art techniques of inducing birefringence in an optical fiber or waveguide serve a useful function, but in terms of UV-induced birefringence, the levels are very low unless specialty high germania doped optical fibers are used. For femtosecond IR induced birefringence by exposing a portion of the core or cladding, very high intensities are required, often by focusing regeneratively amplified femtosecond laser pulses with high numerical aperture (NA) microscope objectives to near diffraction limited focal spot sizes (a few microns in diameter) in order to produce multiphotonic absorption and multiphotonic ionization and disruption to the glass structure. The resultant levels of induced birefringence are also low and on the same order of UV laser induced birefringence (~$10^{-5}$). The induction of birefringence through exposure of the core to high intensity femtosecond infrared laser pulses that result in multiphotonic ionization of the exposed region, also generate significant loss in the waveguide due to scattering. For fiber laser applications especially those requiring short fiber laser cavity designs, this scattering loss limits the output power and performance of the fiber laser.

BRIEF INTRODUCTION TO THE INVENTION

For applications such as short cavity fiber lasers where induction of large levels of birefringence is important without inducing high levels of loss, we have discovered that if periodic regions of high material stress are induced in the cladding region of an optical fiber, proximate the core region using the technique taught by Mihailov et al. in U.S. Pat. No. 6,993,221 incorporated herein by reference, a birefringence as large as those that are generated in specialty high birefringence fiber designs using stress rods can be locally created in the core region of a standard optical fiber without generating additional insertion loss. The periodic regions of stress induced in the cladding of the optical fiber must be adjacent to the core but not close enough to the core as to result in a significant overlap of the fundamental guided mode with the regions of the cladding where the periodic stress was induced. This distance is approximately 2 to 5 μm from the core/cladding interface. This invention relates to methods of generating localized large birefringence in standard single mode fiber by creating regions of high material stress in the fiber cladding with femtosecond infrared radiation. It is preferred there be a ratio of about 10 to 5000 of these regions or pillars of stress per millimeter, and preferably but not limited thereto, these regions are periodic or quasi-periodic.

Low reflectivity fiber Bragg gratings inscribed in the core can be used to probe the level of femtosecond IR induced birefringence by monitoring the PDW.

Unlike Bragg grating structures, these periodic regions of high material stress in the cladding are not used interferometrically as is a grating structure. As such there is no requirement for the regions of material modification to overlap appreciably with the mode of interest that propagates along the core of the waveguide. The periodic regions of high material stress in the waveguide cladding can be lossy or even opaque when probed directly with light. As well, the periodic structures can be quasi-periodic. A small variation in the periodicity of the structure along the length of the waveguide or 'chirp' of the periodic structure would likely produce the same levels of birefringence. Therefore the periodic spacing of the stress lines need not be fixed along the entire length of the structure but can be slowly varying, for example the periodic spacing may increase along the length.

Short cavity fiber lasers typically comprise a resonator laser cavity having two Bragg grating mirrors inscribed into the fiber core. The Bragg grating mirrors comprise the resonator cavity. The core region of the optical fiber is typically doped with active ions such as Erbium or Ytturbium that are optically pumped in order to excite the active ions and promote lasing. In order to insure that the laser cavity resonates on only one polarization mode, thus eliminating the deleterious effect of mode hopping of the laser cavity between different polarizations, the resonator cavity gratings are typically inscribed in polarization maintaining (PM) fibers which additionally need to be doped with the active ions as well as being photosensitized to ultraviolet light by co-doping with Ge. This kind of specialty fiber that is simultaneously active, polarization maintaining or birefringent, and photosensitive is expensive to produce. The prior art technique of creating birefringence in a fiber laser cavity using specialty fiber designs serves a useful function, however the creation of a region of periodic stress using femtosecond radiation in the manner presented here, proximate one of the resonator cavity mirrors, locally induces birefringence will cause the laser cavity to resonate on only one polarization mode, removing the need for specialty polarization maintaining fiber designs.

By using the technique taught by Mihailov et al. in U.S. Pat. No. 7,031,571, the fiber requirements for fabrication of the laser cavity are further simplified in that fiber co-doping with Ge to promote UV-photosensitivity is no longer required. Germanium co-doping of Erbium doped active silica fiber promotes clustering of Er3+ ions that reduces the lasing efficiency of the active fiber. In the absence of Ge, higher levels of Er3+ doping are possible which increases lasing efficiency. Creation of the laser cavity mirrors both in the core and cladding region of the active fiber reduce coupling to cladding modes, as taught in 7,031,571. The removal of the cladding mode losses of the resonator cavity mirrors improves the lasing efficiency of laser cavity, especially if one of the cavity mirrors has a slowly varying periodicity or grating chirp.

The induction of large levels of birefringence possible in standard single mode optical fibers with the femtosecond IR laser irradiation technique presented here, makes attractive the use of this technique to fabricate intrinsic optical fiber grating sensors that can simultaneously measure temperature and strain, without the use of complex polarization maintaining fiber designs. By using the technique taught by Mihailov et al. in U.S. Pat. No. 6,993,221, the resultant fiber grating sensor also has the additional advantage of being able to operate at high temperatures (1000° C.) approaching the glass transition temperature of the silica fiber.

It is an object of this invention to overcome the aforementioned limitations within the prior art systems for generation of laser-induced birefringence in optical fiber or waveguides.

It is a further object of this invention to provide a technique for fabrication of a single short cavity single polarization fiber laser.

It is a further object of this invention to provide a technique for fabrication of a fiber Bragg grating sensor that can simultaneously measure temperature and strain and temperatures up to 1000° C.

SUMMARY OF THE INVENTION

In accordance with the invention there is provided, a method of inducing birefringence in an optical waveguide comprising the steps of:

providing an optical waveguide having a core and a cladding and a core cladding interface;

irradiating the waveguide cladding with energy of a sufficient intensity so as to induce a stress in the optical waveguide wherein said irradiation causes a multitude of spaced stress induced regions within the cladding of the optical waveguide such that there are 100 to 50000 spaced regions per cm.

In accordance with the invention there is further provided an optical waveguide having stress induced regions comprising a length of light transmissive material having a core and a cladding and a core-cladding interface.

said optical waveguide having a stress induced region comprising a plurality of spaced stress pillars within the cladding, wherein the number of stress pillars is between 10 and 5,000 per millimeter; and wherein said regions are proximate the core such that an operating mode of the waveguide, that mode being made birefringent, does not significantly overlap with the stress induced region, such that any reflectivity of that mode which may occur due to the stress induced region is less than 1% when light guided in that mode is incident on the stress induced region.

Advantageously the optical waveguide having the stress pillars can form a sensor or can form a fiber laser.

BRIEF DESCRIPTION OF THE DRAWINGS

Exemplary embodiments of the invention will now be described in conjunction with the drawings in which:

FIG. 10a is a schematic representation of fiber laser incorporating Bragg grating resonance mirrors within a non-polarization maintaining optical fiber where one of the resonator mirrors is made to have a birefringent response by processing the cladding region proximate the resonator mirror with high intensity modulated femtosecond radiation.

FIG. 10b is a simple set up for launching the pump laser radiation into the fiber optic laser cavity is shown in FIG. 10a.

DETAILED DESCRIPTION

Figure 1:
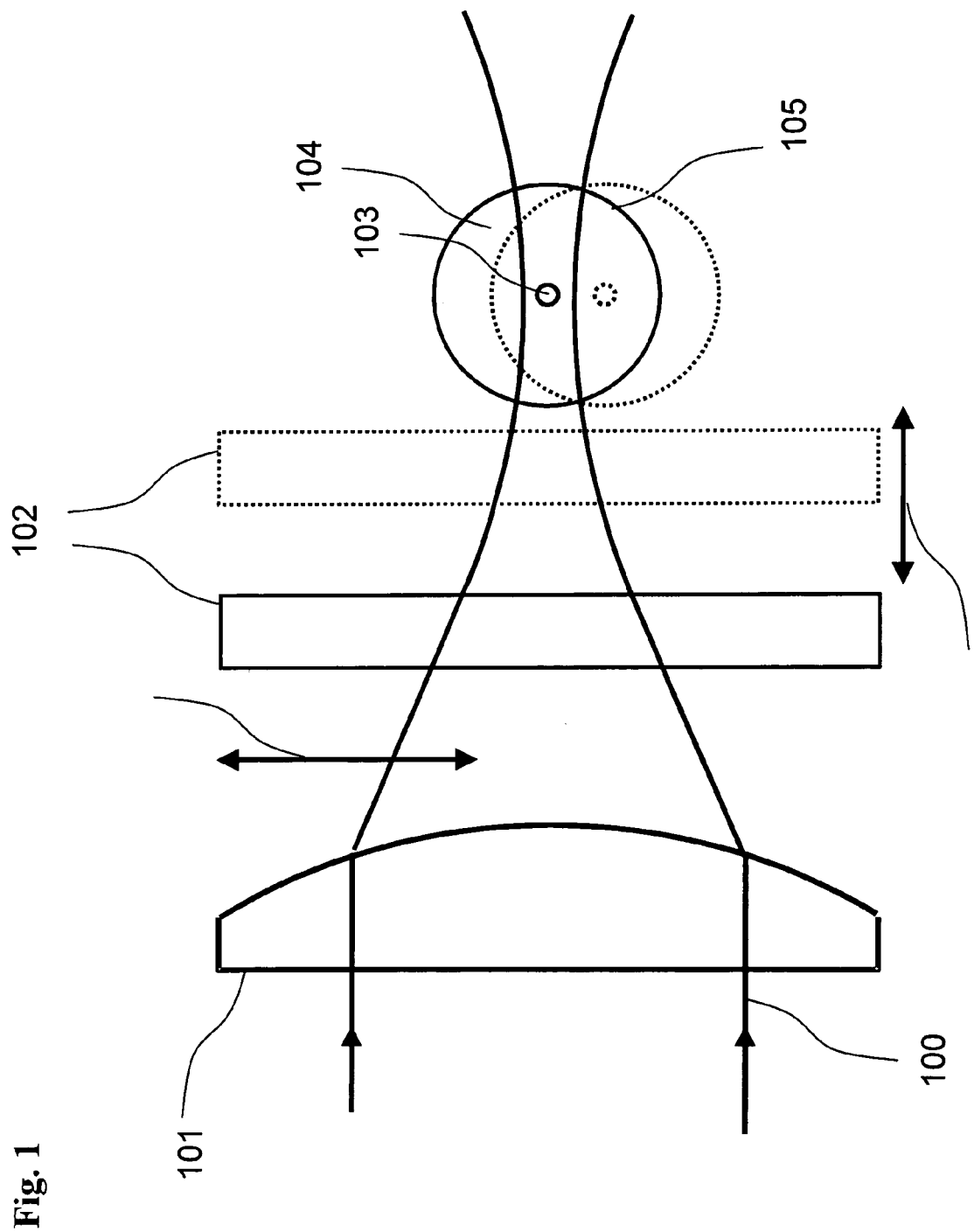
FIG. 1 is a schematic diagram of the exposure set-up used to induce a probe Bragg grating in the core of an optical fiber as well as the periodic stress structures in the cladding with the femtosecond IR beam and the phase mask, wherein the image taken along the exposure beam axis.

The fiber Bragg probe gratings (FBGs) and the periodic stress regions in the cladding of the silica fiber were generated using a Ti:sapphire amplification system operating at a wavelength of 800 nm (FWHM of 10 nm). As shown in FIG. 1, the 800 nm radiation of the IR writing beam 100 with a Gaussian profile and 6.4 mm diameter, was focused using a 30 mm focal length cylindrical lens 101 through a phase mask 102 into the core 103 or cladding 104 of the single mode fiber 105. The IR beam was polarized along the fiber axis. A phase mask pitch $\Lambda_m$ producing a third order Bragg resonance was selected in order to create the spatially modulated exposure that could be directly observable under an optical microscope. The Bragg condition for a third order grating is $3\lambda_{Bragg}=n_{eff}\Lambda m$, where $\lambda_{Bragg}$ is the wavelength of the Bragg resonance and $n_{eff}$ is the effective refractive index of the core. In order to expose a large transversal area of the fiber either in the core or in the cladding region, the focused laser beam scanned 106 a 30 µm span in 10 seconds normal to the fiber axis using a piezo-driven translation stage. As was shown previously by Sudrie et al. in *Opt. Comm., vol.* 191, pp. 333-339, 2001, two types of femtosecond laser induced structures can be generated in bulk silica resulting either from a defect formation/material compaction induced index change (type I) or from material ionization and resolidification (type II). For the induction of high levels of stress in the material, it was advantageous to work in the type II regime. When placing the target fiber a distance d 107 several millimeters from the phase mask, as taught by Mihailov et al. in U.S. Pat. No. 7,031,571, the mask order walk-off process produces a two-beam interference pattern, which at moderate laser pulse power, produces type I structures which produce index changes with behavior similar to type I UV laser induced Bragg gratings. When the phase mask 102 is placed in close proximity of the fiber 105, as taught by Mihailov et al. in U.S. Pat. No. 6,993,221, the mask generates a multi-beam interference field with high peak intensities resulting in the generation of periodic type II laser induced structures that are stable up to the glass transition temperature of the material.

One might initially presume that a single photo-exposed region would generate higher birefringence than is induced using a periodic exposure over the same spatial extent, but we have experimentally demonstrated that this is not the case. It is well known that waveguides subjected to an asymmetric stress distribution can become birefringent due to the elastooptic effect. In order to generate stress, opposing forces are required, and in the case of ultrafast exposure these arise from the bulk glass opposition to material displacements precipitated by photoinduced changes at the molecular level. More specifically, in order to avoid failure the differing displacements of exposed and unexposed regions must be reconciled at the common boundaries connecting them, similar to the manner in which the displacements of an expanding crack must be resolved at the crack tip. In the Type II regime, the formation and expansion of microvoids has a very large tendency to induce localized strains, which must be matched by the bulk glass. This is more difficult to accomplish at the boundaries between such regions, resulting in higher stresses at these locations, just as stress concentrations are observed at a crack tip. Larger displacements of the void boundaries, frozen into the glass during photo-inscription, result in higher stress gradients at these boundaries. Ultimately, in order to generate large levels of birefringence the challenge is to maximize the magnitude of displacements frozen into the fiber cross section without generating catastrophic failure. From fracture analysis it is well known that longer cracks are more prone to failure. Hence, a distributed type II photoinduced structure, analogous to many small cracks, can induce greater transverse displacements and stress prior to fibre failure than can be generated by a single long void/crack occupying the same axial extent. Although the distribution need not be strictly periodic in order to take advantage of this effect, it is expected that structures having some degree of periodicity will most efficiently increase the average transverse displacement/stress/birefringence per unit of fiber length.

Type I structures were written with 120 fs autocorrelated pulses with energy between 600 pJ and 1.5 mJ depending on the magnitude of the desired effect, 100 Hz repetition rate and with the fiber placed a distance 107=4 mm away from the phase mask 102. The type II periodic structures were written with 1.5 mJ, 500 fs pulses at 10 Hz, with the fiber 105 placed a distance 107 ~500 µm away from the phase mask 102, by translating 102 toward the fiber 105. The laser pulses were chirped to 500 fs by adjusting the pulse compressor within the amplifier laser system. By chirping the pulse, the order walk-off process no longer occurs 500 µm away from the mask. All orders diffracted by the mask interfere producing a complex interference field pattern with high intensity peaks. The combination of complex field and increased pulse duration facilitates the formation of the damage type II structure as was described by Mihailov et al. in the *Proceedings of the Bragg Gratings, Photosensitivity and Poling in Glass Waveguides Conference* BGPP2003, pp. 194-196, 2003.

The probe Bragg grating spectra were monitored during the writing process using an Er+ white light source and an optical spectrum analyzer (OSA) with 50 pm accuracy and then re-measured after writing using different input signal polarizations from a high resolution (5 pm) tunable laser scanning system. The polarization of the signal was rotated using a free space in line OFR polarizer controller.

In order to probe the birefringence in the waveguide core, caused by the femtosecond laser exposure in the cladding of the standard single mode fiber (SMF-28), weak type I femtosecond IR laser induced probe Bragg gratings (2-4% reflectivity) were written in the core of the fiber with 120 fs pulses and low pulse energy (~600 µJ) as described above. After the weak grating spectrum was recorded, the PDW of the probe grating was measured and confirmed that no birefringence was induced in the fiber by the laser exposure.

A number of experiments were conducted in order to create a large birefringence in the core of the SMF-28 fiber. The cladding of the fiber proximate to the probe grating was exposed with fringeless exposure by removing the phase mask or alternatively the cladding of the fiber was exposed with ultrafast radiation through a phase mask with beam intensities that would produce type I and type II structures.

The cladding exposures, periodic or not, were performed close to the core but not close enough to affect the spectrum of the probe grating written in the core of the fiber. The probe core gratings and the periodic structures inscribed into the cladding were written with different phase mask pitches (either $\Lambda_m$=3.192 mm or 3.171 µm), which would result in a 10 nm separation in the Bragg resonances. In this way the interference between the signal reflected by the probe grating and any potential signal reflected by the cladding structure overlapping with the core mode was avoided. The term periodic used to describe this invention include quasi-periodic structures as well, such as structures with a non-uniform period with a value between 0.2 and 100 microns but could also have a period that varies along the waveguide length, that is being chirped.

The intrinsic birefringence in SMF-28 fiber is on the order of $10^{-6}$ and varies along the fiber length in both amplitude and orientation (the fast or slow axis). There was no measurable change to the fiber birefringence for the fringeless exposure at 1.5 mJ and 1000 Hz repetition rate using the focusing arrangement shown in FIG. 1 in the absence of the phase mask 102, even when the exposure of the cladding adjacent to the core was strong enough to modify locally the effective core refractive index. This was demonstrated by the deformation of the probe grating spectrum that produced side lobes. Assuming a Gaussian beam focusing arrangement, a line focus was produced having the dimensions of 4.78 µm×6.4 mm producing a peak intensity of the beam of $4\times10^{13}$ W/cm$^2$, which is the threshold intensity for type-II multiphotonic ionization in the material. A non-periodic type-II damage structure in the cladding proximate the core did not produce stresses that propagated to the core that would result in stress-induced birefringence.

Figure 2:
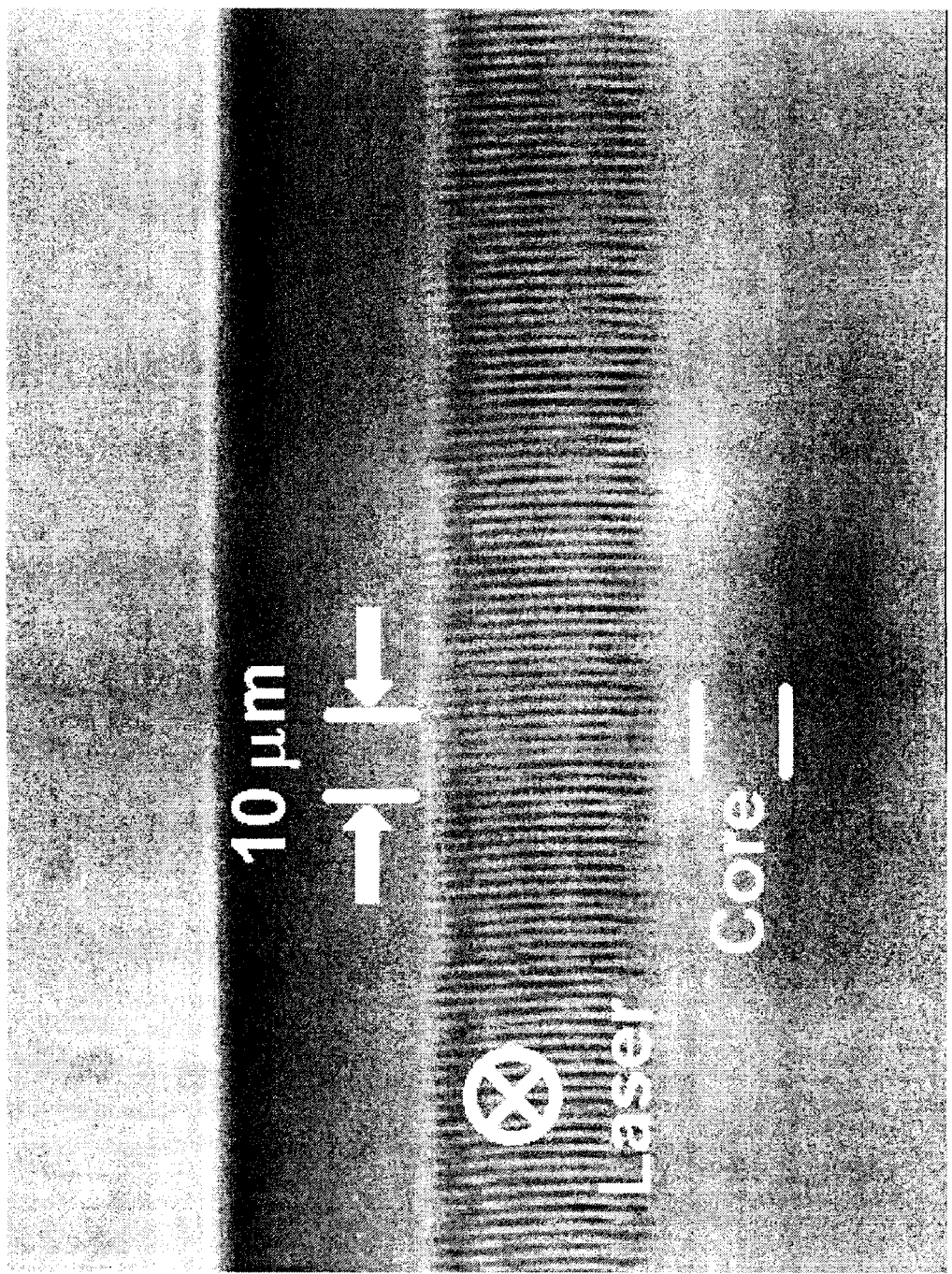
FIG. 2 is a photograph of a microscope image of the periodic regions of stress induced in the cladding of a standard optical fiber proximate the core region.
Figure 3:
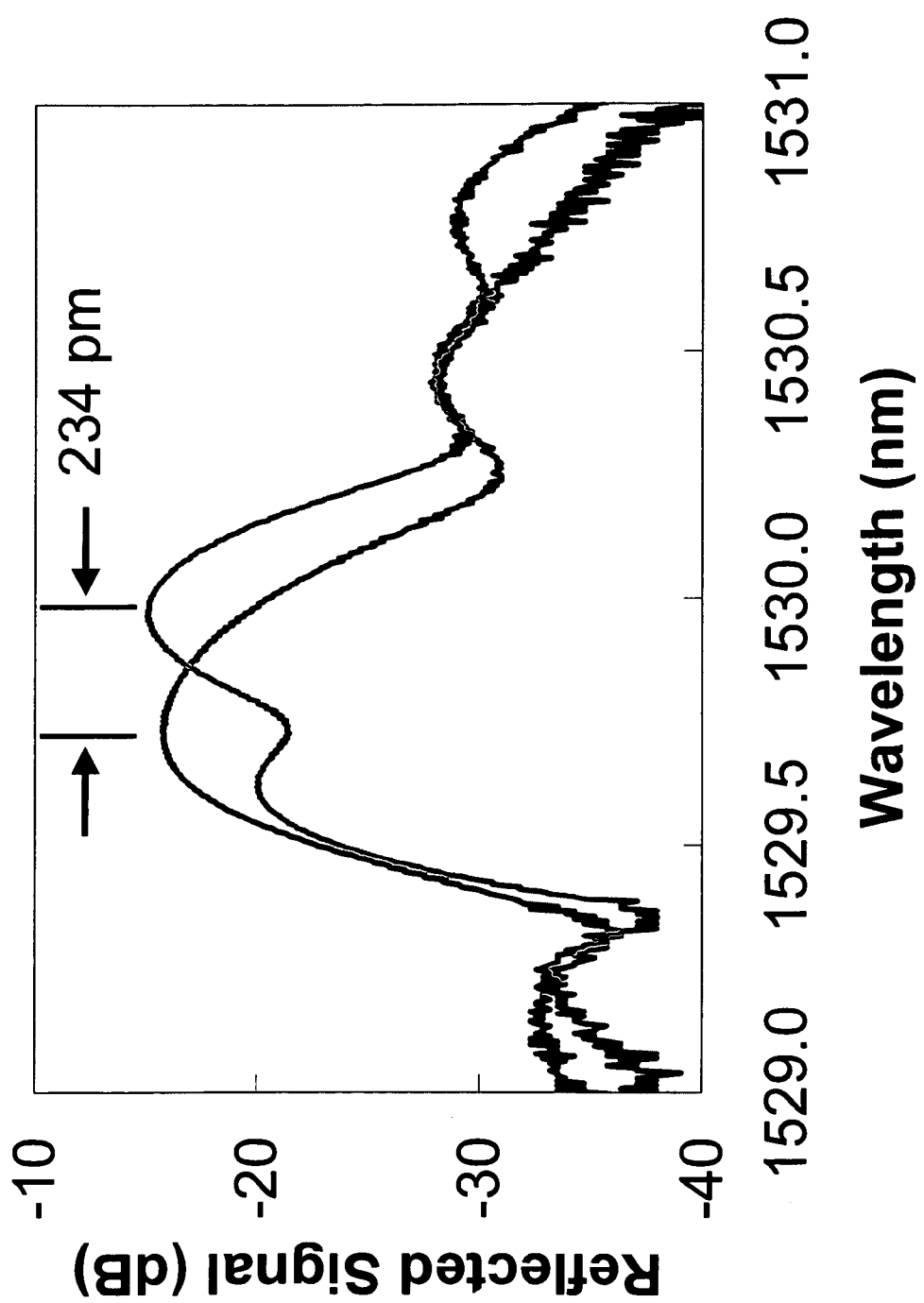
FIG. 3 illustrates the polarization split of ~234 pm of a weak probe Bragg grating resonance after type II periodic exposure of the cladding proximate the core.

Only a very weak birefringence of $\sim2\times10^{-5}$ ($\sim20$ pm PDW) was measured when the cladding of the fiber was exposed through the phase mask producing a type I exposure with 1.5 mJ femtosecond pulses using the technique presented by Mihailov et al. in U.S. Pat. No. 7,031,571. Such an exposure normally results in $\sim10^{-3}$ change in the refractive index of the glass. The type II exposure, with the parameters described above, at the core-cladding interface as shown in FIG. 2, resulted in a relatively large PDW of $\sim250$ pm as shown in FIG. 3. This value of PDW was reached in an iterative way by scanning repeatedly the cladding to the core/cladding interface in 20-second cycles with 10 Hz repetition laser rate of the 1.5 mJ pulses. Because of the scanning nature of the exposure cycle, the laser exposure (beam dwell time) is larger (longer) close to the core/cladding interface. The dynamics of how the induced birefringence changes with the number of scans is presented in the FIG. 4 where the change in the refractive index of the ordinary axis is denoted by the diamonds, the extraordinary by squares and the birefringence by triangles.

Figure 4:
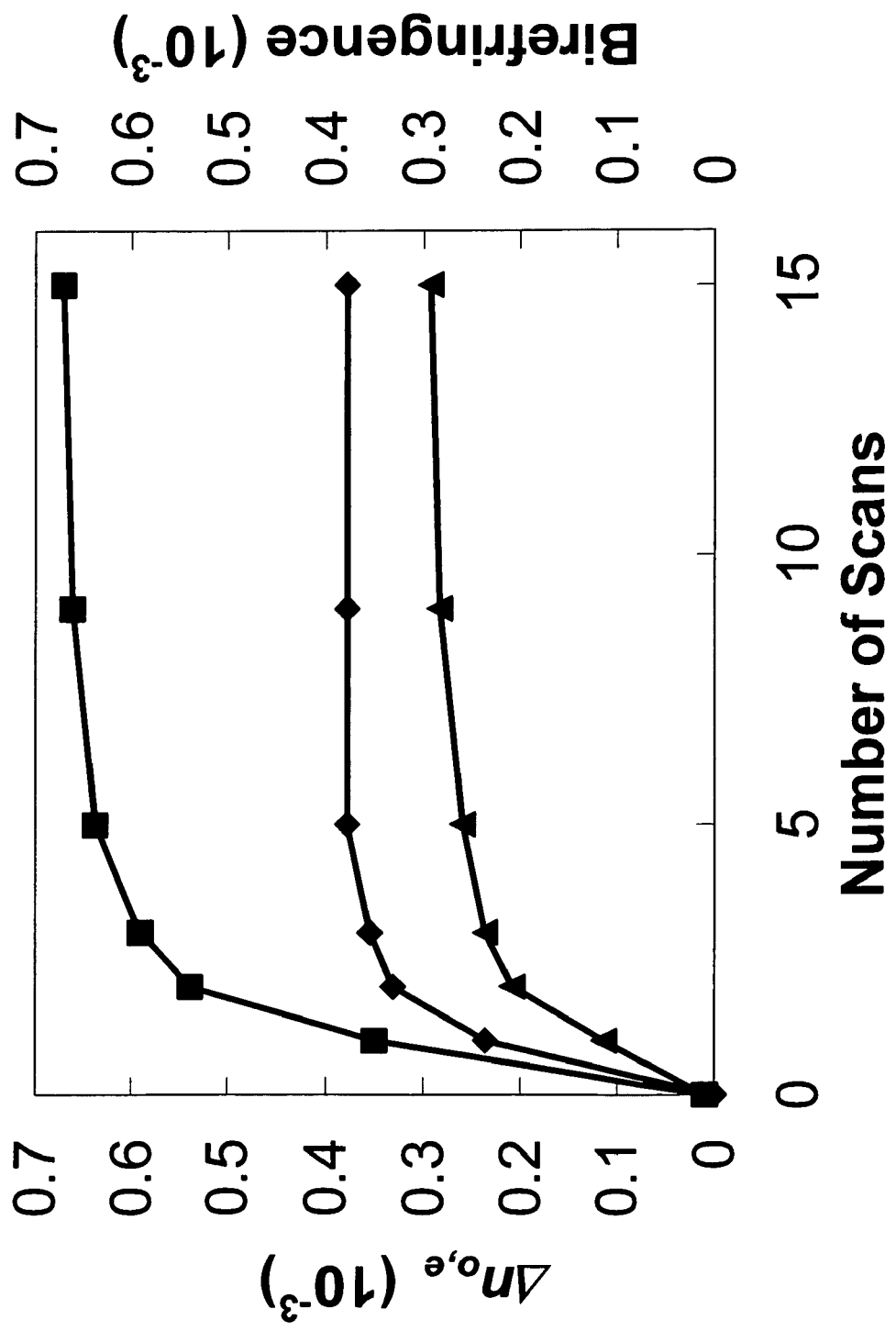
FIG. 4 is a graph denoting the saturation effects in the evolution of the effective refractive indexes and birefringence.

As can be seen in FIG. 4, there is a very strong saturation tendency for both variations of the refractive index $\Delta n_{o,e}$ and the birefringence where o and e are the ordinary and extraordinary polarization axis. The refractive index change was evaluated based on the wavelength shift $\Delta\lambda_{o,e}$ of the probe Bragg grating resonance for the two polarizations:

$$\frac{\Delta\lambda_{o,e}}{\lambda_{Bragg}} = \frac{\Delta n_{o,e}}{n_{eff}} \quad (1)$$

A successive exposure into the cladding on the same fiber but on the opposite side of the core from the first exposure, resulted in a further increase of the PDW of 50 pm of the grating presented in FIG. 3. Depending on the exposure conditions, the second exposure could be more efficient resulting in a further 100-150 pm increment of the PDW.

Figure 5:
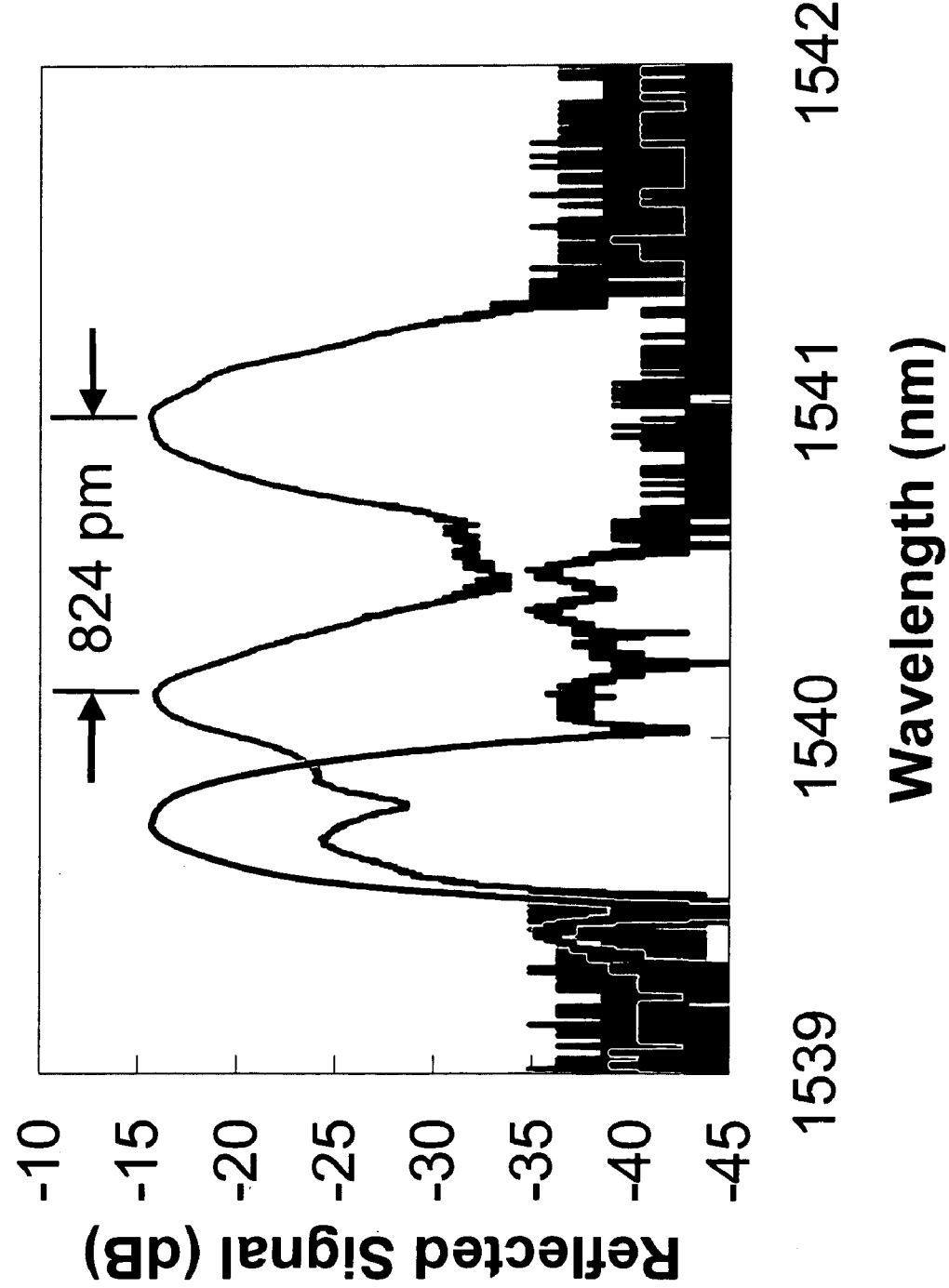
FIG. 5 is a graph denoting a large birefringence effect obtained by parameter optimization (pulse duration 650 fs, energy 1.5 mJ).

Optimization of the exposure conditions, such as exposure proximity to the fiber core, fiber-phase mask distance, amount of pulse chirp etc, resulted in an increased birefringence of $6-8\times10^{-4}$ (PDW~800 pm) as shown in FIG. 5, a value of birefringence that is large even for specially designed Hi-Bi fibers. A small amount of distortion of the original weak probe grating can be seen. Similar tests performed on other single mode fibers, such as pure silica core, or fiber with low cut-off wavelength, resulted in the creation of a very similar birefringence. Tests made with a first order phase mask also gave similar results.

The cause of the induced birefringence is likely a stress effect similar to the one created by stress rods in a PM fiber as well as an asymmetry in the refractive index change about the core similar to the elliptic cores found in some PM fibers that change the propagation conditions in the corresponding polarization direction. Stress induced effects by focused femtosecond exposure have been described by Bhardwaj et al. in *Opt. Lett.* 29 (12), pp. 1312-1314, 2004.

In order to get some insight into the nature of the induced birefringence, the probe Bragg grating shown in FIG. 4 was annealed at 150° C. for 24 hours. A 25 pm decrement (~8% variation) in the grating birefringence was measured with no noticeable change in the effective refractive index of the fundamental mode. As type II structures are extremely stable even at very high temperatures as described by Grobnic et al in *Meas. Sci. Technol.* 17 (5), p. 1009-1013 (2006), the birefringence is likely caused by induced stress in the material. A dependence of the PDW on axial strain applied to the fiber was also observed. A ~20 pm variation in PDW was measured before and after a ~300 g stretching strain was applied to the fiber.

Since the cladding structure had a different periodicity when compared to the periodicity of probe Bragg grating in the fiber core and no spectrum from the cladding structure was observed, the cladding exposure resulted in a global fringeless distribution of stress outside the irradiated zone within the cladding otherwise a Bragg resonance from the cladding structure would be observed. Multiphoton absorption and plasma formation associated with high intensity femtosecond exposure in silica likely produces high temperatures that can result in material expansion and stresses induced within the silica host. The periodic nature of the plasma formation enhances the amount of material stress that is generated outside the irradiated zone as compared to a non-periodic region. The modest reduction of the birefringence observed during annealing is likely due to stress relaxation.

Figure 6:
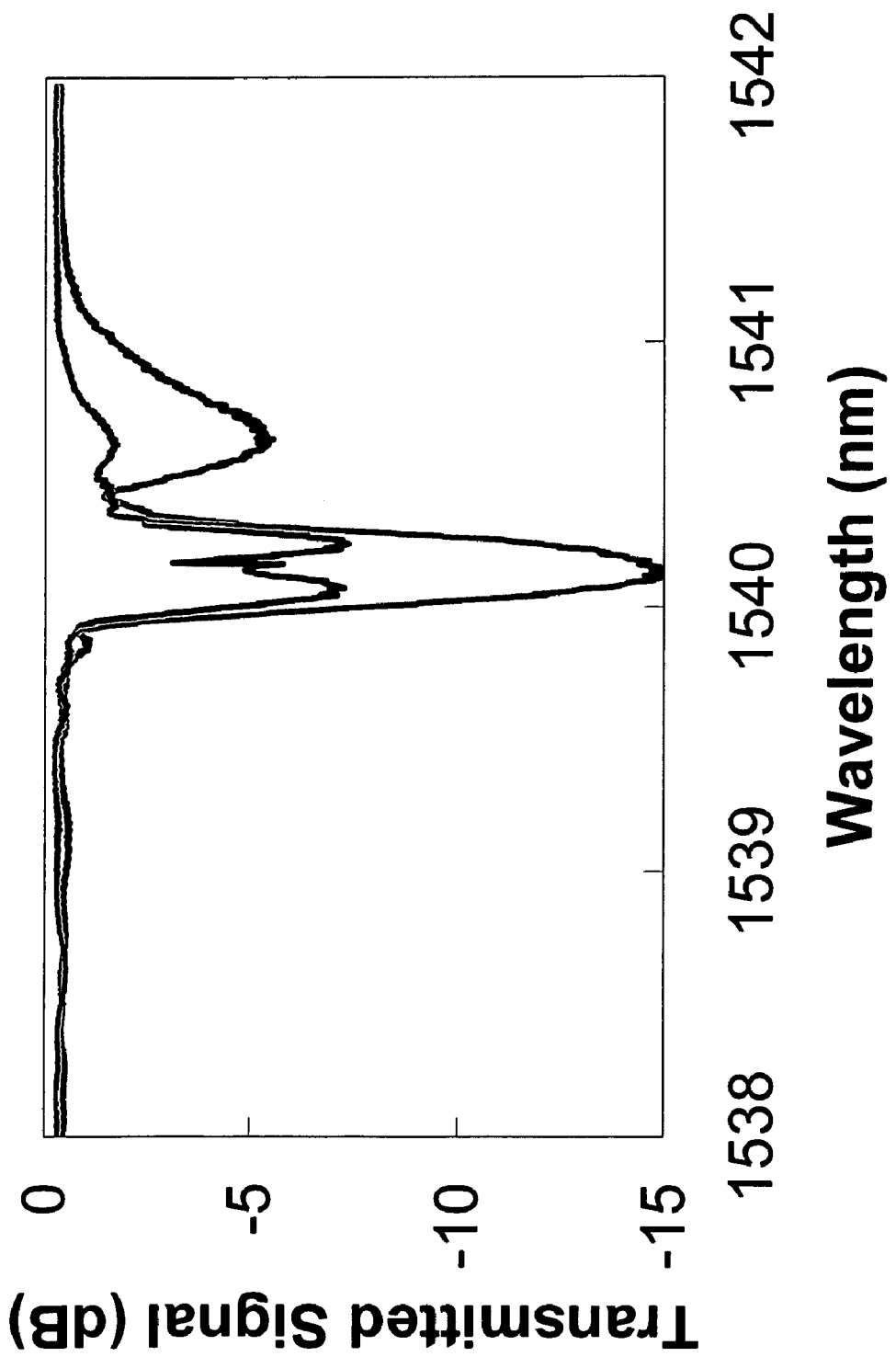
FIG. 6 is a graph denoting a large birefringence of the refractive index modulation induced by symmetric cladding exposure of strong type I core gratings.

When applied to strong type I probe Bragg gratings in the fiber core (~95% reflectivity) written with 1200 µJ at 200 Hz, the type II periodic structures in the cladding resulted not only in increased birefringence of the effective core mode, as measured by induced PDW, but also resulted in a large grating strength difference between orthogonal polarization axes ($\Delta$Tr) for the Bragg resonance as shown in FIG. 6. As can be seen in FIG. 6, the ordinary polarization corresponds to a 15 dB strong grating while the extraordinary polarization results in a secondary resonance of 5 dB located 540 pm away from the main resonance (~$5\times10^{-4}$ birefringence) resulting in $\Delta$Tr=10 dB. A type I probe Bragg grating of similar strength written in the core without a cladding exposure had an induced birefringence of ~$10^{-5}$. The difference in the refractive index modulation with polarization based on the evaluation of the refractive index modulation of the two gratings resulted in a value of ~2×10$^{-4}$ assuming the approximation of the fundamental (first order) grating. Since the spectrum of the original grating measured before the cladding exposure did not display a large ΔTr at the Bragg resonance, it can be assumed that the initial refractive index modulation was similar for the two principle states of polarization and the change in ΔTr was a result of the cladding exposure.

Figure 7:
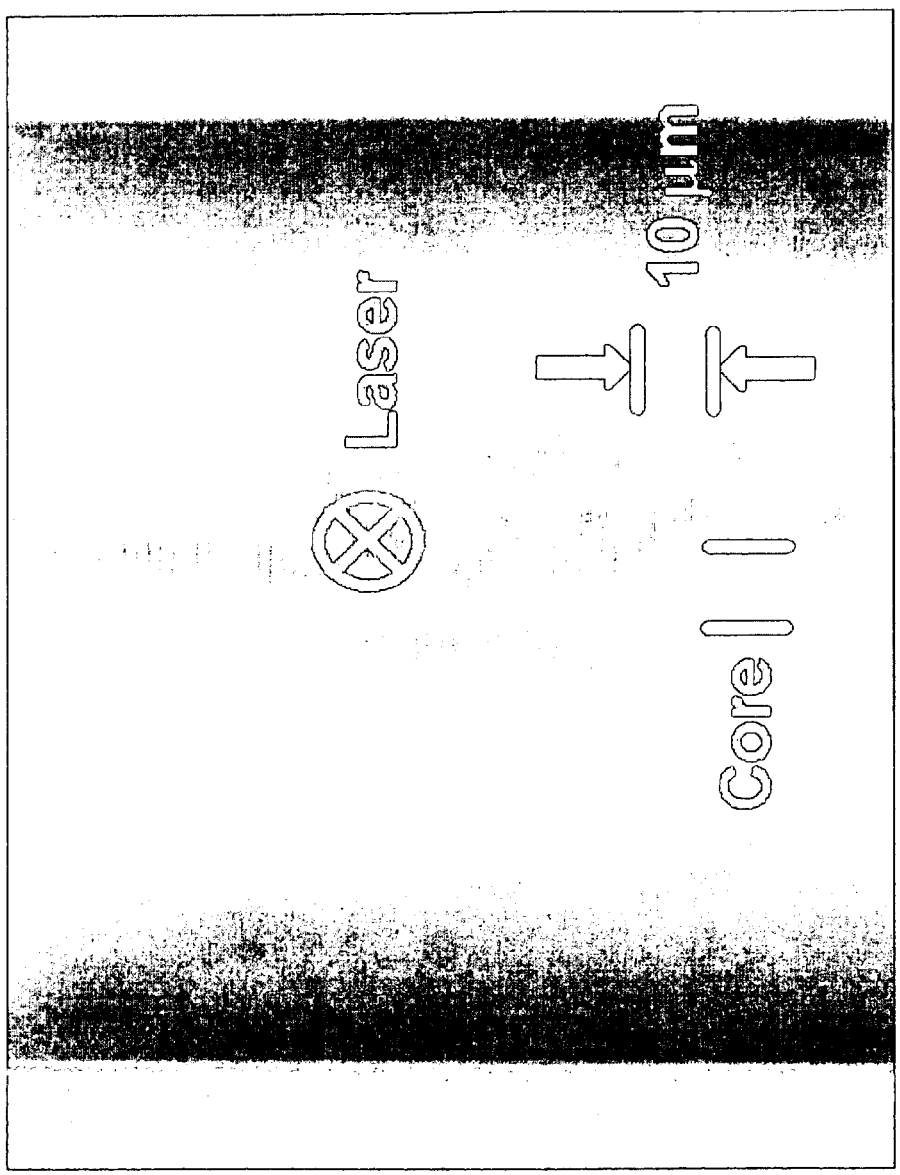
FIG. 7 is a photograph of a microscope image of a type II femtosecond IR laser induced grating overlapping the core-cladding interface. Image taken along the exposure beam axis.
Figure 8:
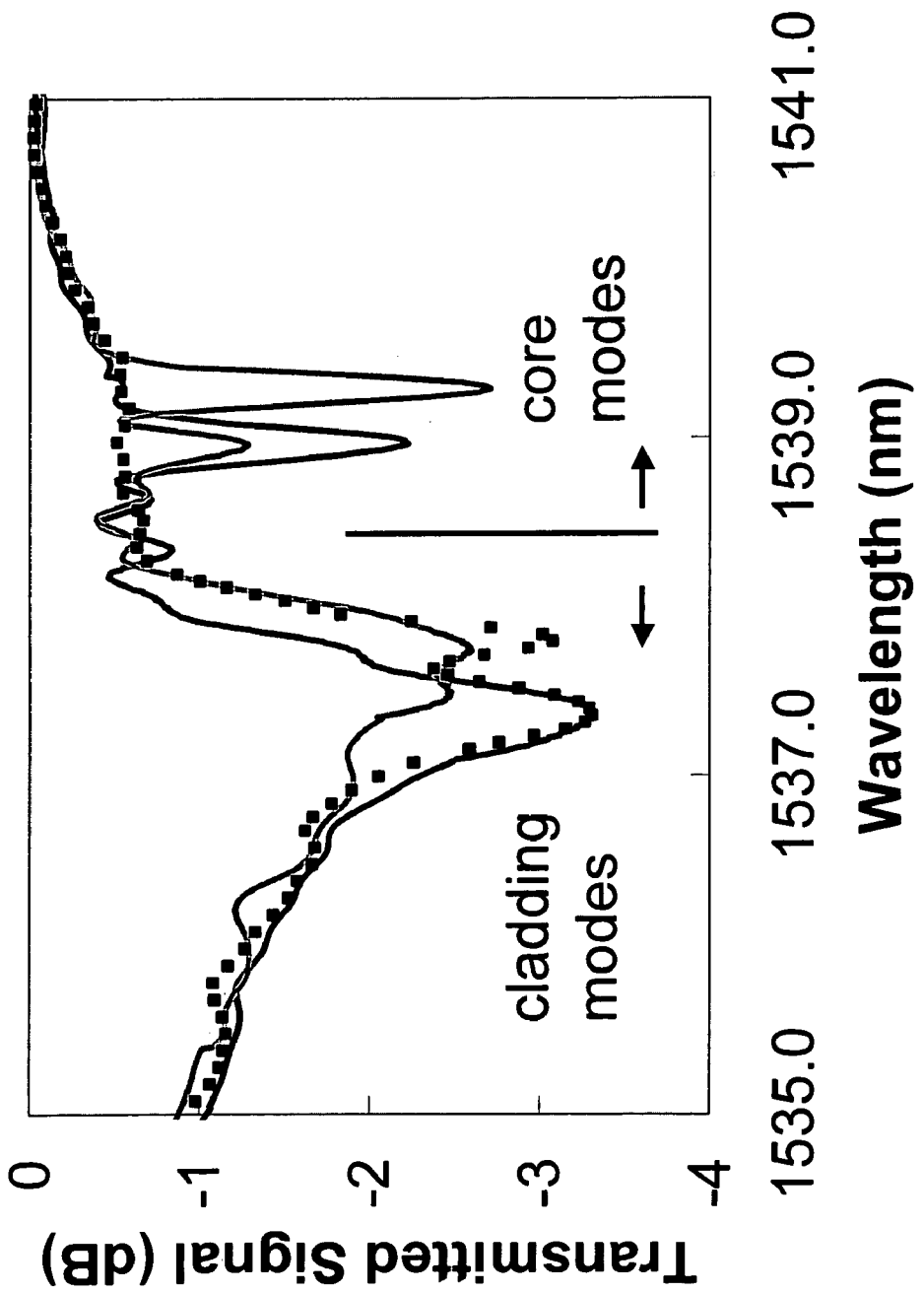
FIG. 8 is a graph denoting the polarization dependent transmission spectrum of the grating seen in FIG. 6.

In an attempt to create Bragg gratings that display larger birefringence, type I and type II femtosecond IR laser induced Bragg gratings were written at the core/cladding interface. In this instance, no weak probe grating was required. Only a weak birefringence effect was obtained for type I gratings. A type II grating structure as shown in the microscope image of FIG. 7, resulted in a stronger variation in reflectivity with polarization compared to the type I-IR case and a very strong coupling to cladding modes. The type II gratings are often affected by side lobs and strong coupling to cladding modes as has been described by Mihailov et al in *J. Lightwave. Technol.* 22 (1), pp. 94-100, 2004. These features are accentuated when the gratings are written at the core/cladding interface. Such a strong polarization dependent loss is ideally suited for the formation of short cavity single polarization fiber lasers. The grating spectra presented in FIG. 8 display three preferential polarization states. There are two polarization states, P1 and P2, that maximize Bragg resonances separated by 300 pm corresponding to a birefringence of ~3×10$^{-4}$. The polarization state of the signal can be adjusted to a different polarization so that there is very little reflectivity displayed by the grating but there is a sizable increase in the coupling to cladding modes that correspond to Bragg resonances related to polarizations P1 and P2, as shown by the dotted line in FIG. 8. Based on the first order grating approximation, the difference in strength between the maximum reflectivity and minimum reflectivity corresponds to a difference between the refractive index modulations of the two polarization states of ~3×10$^{-4}$.

Figure 9:
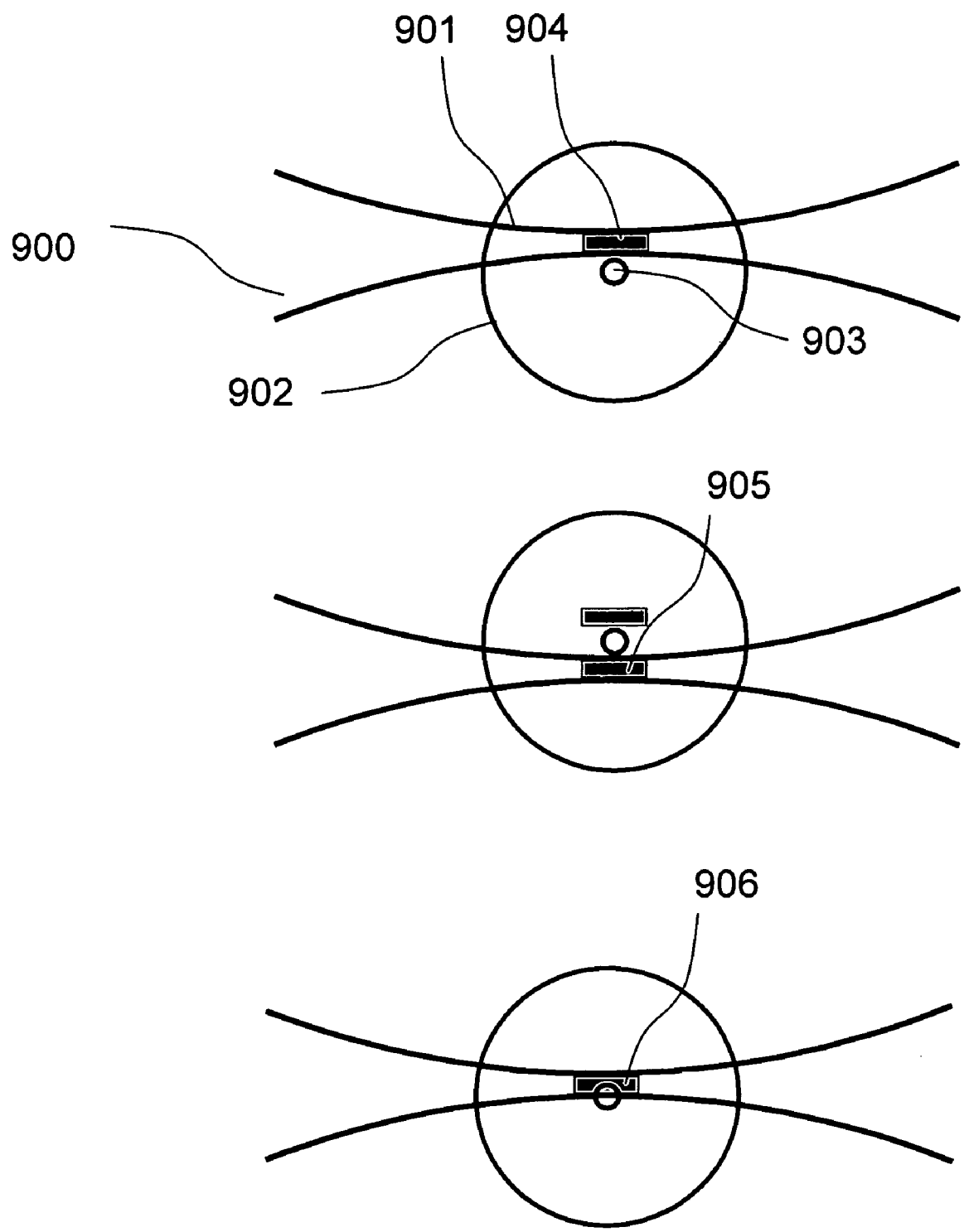
FIG. 9 is a schematic representation of the locations where type II regions of periodic stress are induced in the fiber cladding with relation to the core.

Numerous other embodiments may be envisaged without departing from the spirit and scope of this invention. As shown in Mihailov et al. U.S. Pat. No. 7,031,571 the generation of an index modulation in the cladding that is symmetric about the core will not result in significant localized birefringence in the optical fiber. As presented here, the generation of a periodic stress structure in the cladding or core/cladding region that is asymmetric about the core, results in high levels of birefringence. For the cross sectional representation of the induced region of periodic stress as shown in FIG. 9, there are three possible embodiments of the invention shown. In FIG. 9a) the incident laser beam 900 after passing through the phase mask is focused into the cladding region 901 of the fiber 902 adjacent to but not overlapping the core 903. The inscribed region of periodic stress 904 induces a certain amount of birefringence. After repositioning of the fiber with respect to the irradiating beam 900, a second exposure can be made in order to induce a second region of periodic stress 905 on the opposite side of the core further increasing the birefringence. Alternatively as single grating can be written at the core cladding interface 906.

If the fiber is a photonic crystal fiber with a solid core and a lattice of air holes to make up the cladding, high birefringence can be induced by the generation of a grating structure in the interstitial glass of the air hole lattice that will result in localized birefringence. If the inscription of the grating structure occurs with intense enough radiation to result in localized melting of the glass, localized hole closure will also occur resulting in a localized birefringence seen by the guided mode.

Figure 10:
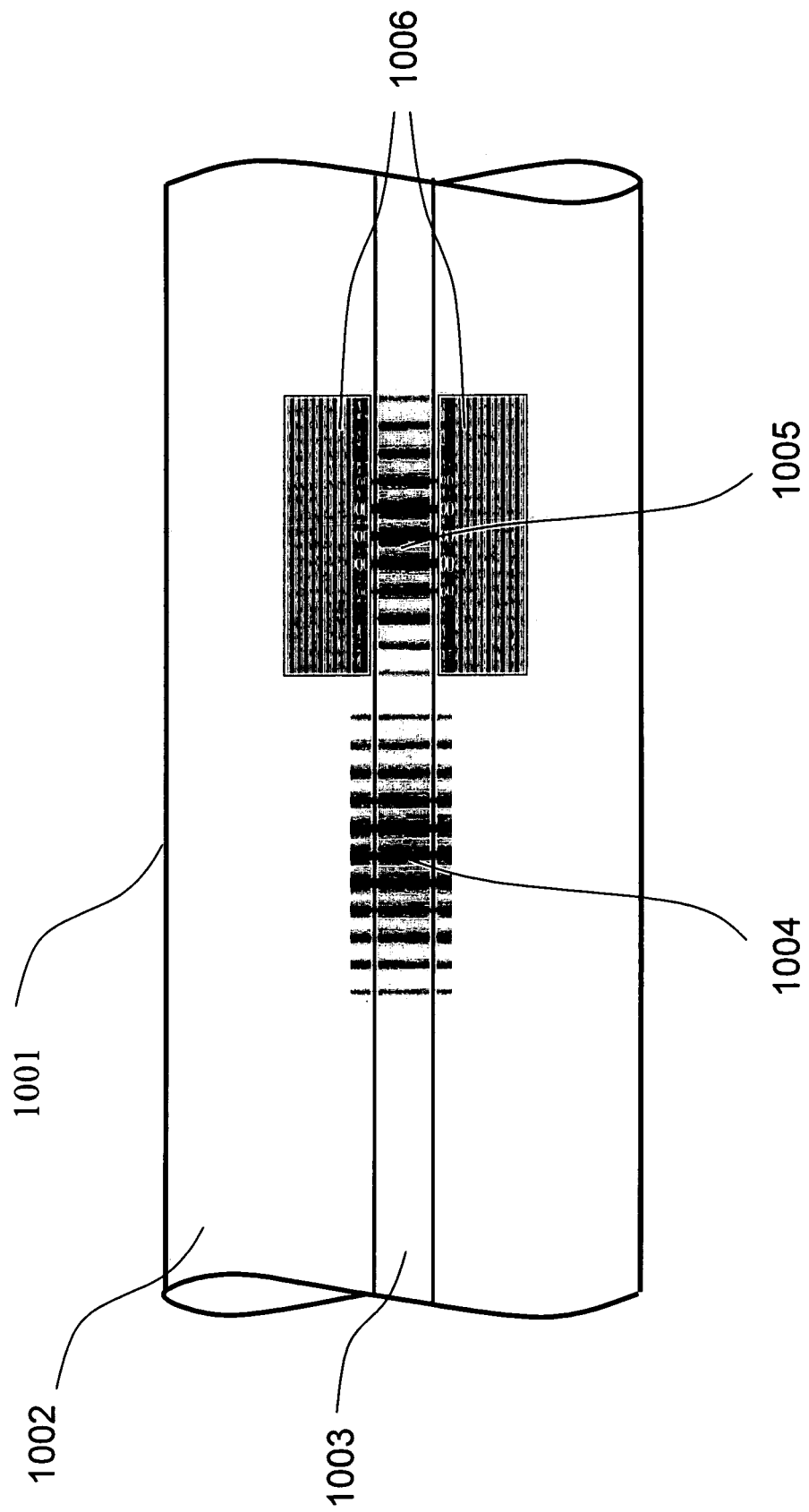
Figure 10:
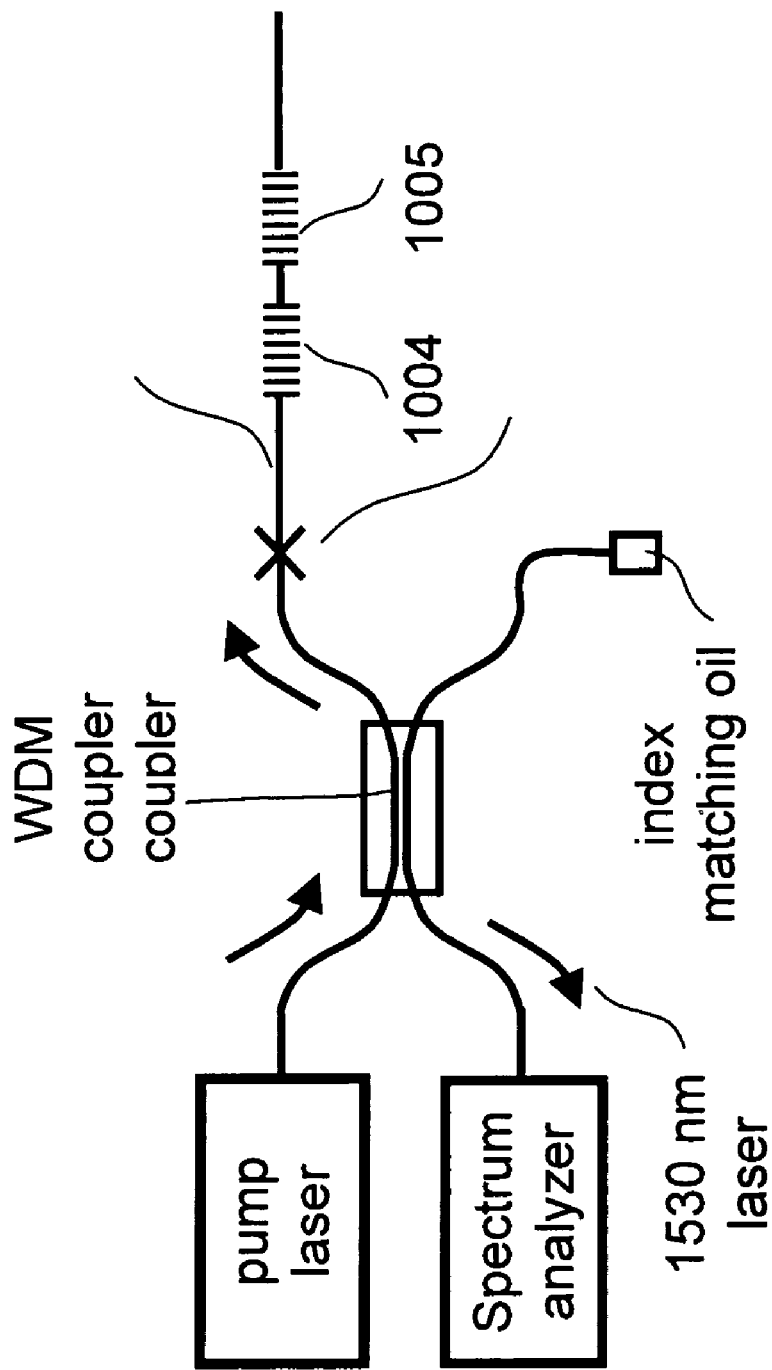

In FIG. 10a, a short cavity fiber laser is presented consisting of an optical fiber waveguide 1001 having a cladding 1002, and a core region 1003 that is doped with an active ion. FIG. 10a is constructed in such a manner as to illustrate, if one could see through the fiber from the side at a particular orientation, the stress induced region adjacent the grating writing into the optical fiber. Typically the cladding 1002 consists of silica while the core 1003 is doped with an active ion such as Erbium or Ytturbium. The laser cavity consists of an output coupler Bragg grating 1004 and a back reflector Bragg grating 1005. Both gratings 1004 and 1005 are inscribed in the fiber such the grating ideally but not necessarily extends into the cladding, in order to reduce cavity losses due to coupling to cladding modes. Regions of periodic stress 1006 are then induced in the cladding proximate the back reflector grating 1005. As well the periodic stress 1006 could be induced about the output coupler 1004 instead of the back reflector 1005. A simple set up for launching the pump laser radiation into the fiber optic laser cavity is shown in FIG. 10b. If the active fiber 1001 is doped with Erbium, the pump laser emits at 980 nm. The fiber laser emission will be in the Erbium emission band ranging from 1510 to 1580 nm. The pump light is routed through a 980/1550 nm wavelength division multiplexing optical coupler to the active fiber which is mechanically spliced to the output fiber of the coupler. The fiber laser emission then returns through the coupler and is directed towards the detector which in this example is an optical spectrum analyzer.

Figure 11:
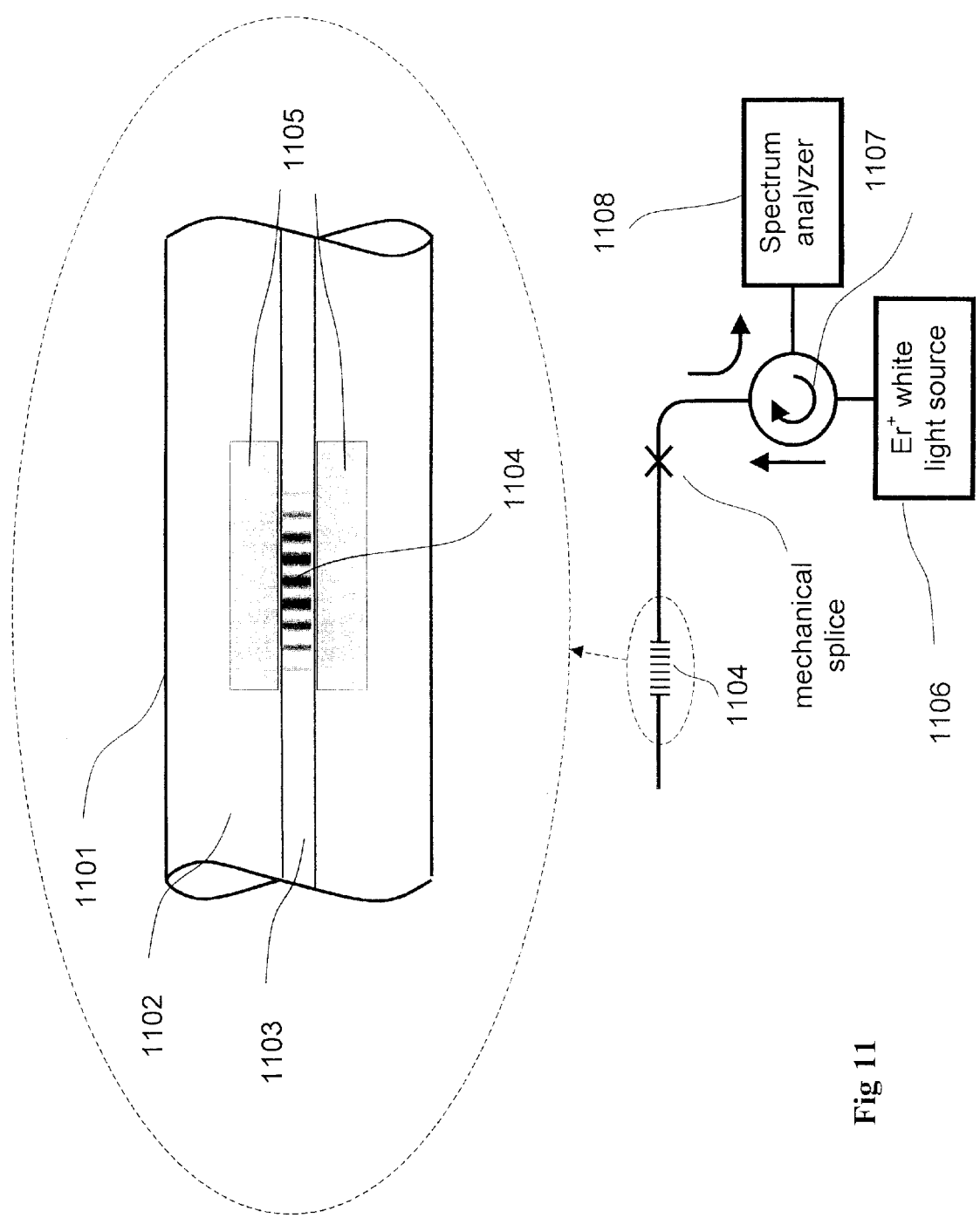
FIG. 11 is a schematic representation of an optical fiber grating sensor system that can simultaneously measure temperature and strain as a result of the femtosecond laser induced birefringence in the cladding proximate the grating in the single mode fiber.

In FIG. 11, a schematic of an intrinsic retro-reflective fiber Bragg grating sensor is shown that consists of a single mode silica based optical fiber 1101 with a cladding layer 1102, a core region 1103 and a Bragg grating structure 1104 that is inscribed with a femtosecond IR laser and a phase mask as taught by Mihailov et al. in U.S. Pat. No. 6,993,221. High birefringence is induced in the fiber by femtosecond IR laser exposure of the cladding regions 1105 such that a multitude of spaced stress induced regions are created such that there are 100 to 50000 spaced regions per cm within the irradiated zone 1105. The induced birefringence makes the retro-reflective Bragg grating sensor capable of simultaneously measuring temperature and strain. The sensing system comprising the retro-reflector 1104 with modified cladding regions 1105 is further comprised of a white light source 1106 that emits a plurality of wavelengths of light that is optically coupled to the end of the fiber 1101 containing the Bragg grating sensor 1104. The white light is passed through an optical circulator 1107 such that the retro-reflected signal passes again through the optical circulator and is redirected by the circulator to the optical spectrum analyzer 1108.

The invention claimed is.

1. A method of inducing birefringence in an optical waveguide comprising the steps of:
   providing an optical waveguide having a core and a cladding and a core cladding interface;
   irradiating the waveguide cladding with energy of a sufficient intensity so as to induce a stress in the optical waveguide wherein said irradiation causes a multitude of spaced stress induced regions within the cladding of the optical waveguide such that there are 10 to 5000 spaced regions per mm and wherein the stress induced regions are proximate the core greater than 2 microns distance from the core-cladding interface.

2. A method as defined in claim 1 wherein the spaced stress induced regions are periodic, or quasi-periodic.

3. A method as defined in claim 2 wherein the period of the stress induced regions are chirped.

4. A method as defined in claim 2 wherein the step of irradiating the waveguide cladding with energy comprises the step of irradiating the waveguide with electromagnetic radiation having a predetermined wavelength range and having a pulse duration less than or equal to 500 picoseconds.

5. A method as defined in claim 4 wherein the step of irradiating the waveguide with electromagnetic radiation having a pulse duration of less than or equal to 500 picoseconds, includes tightly focusing said electromagnetic irradiation in a step and repeat fashion such that the peak intensity within the waveguide cladding is greater than $1 \times 10^{13}$ W/cm$^2$.

6. A method as defined in claim 4 wherein the step of irradiating the waveguide with electromagnetic radiation having a pulse duration of less than or equal to 500 picoseconds, includes passing said electromagnetic radiation through a phase mask so as to produce the periodic stress.

7. A method as defined in claim 4 wherein the electromagnetic radiation is of the sufficient energy and duration so as to cause periodic stress in the cladding that results in voids and densification of the cladding material in the stress induced regions.

8. An optical waveguide having stress induced regions comprising:
a length of light transmissive material having a core and a cladding and a core-cladding interface, said optical waveguide having a stress induced region comprising a plurality of spaced stress pillars within the cladding, wherein the number of stress pillars is between 10 and 5,000 per millimeter; and wherein said regions are proximate the core such that an operating mode of the waveguide, that mode being made birefringent, does not significantly overlap with the stress induced region, such that any reflectivity of that mode which may occur due to the stress induced region is less than 1% when light guided in that mode is incident on the stress induced region.

9. An optical waveguide as defined in claim 8, wherein the operating mode is the waveguide's fundamental mode.

10. An optical waveguide as defined in claim 8 wherein the stress induced regions are periodic or quasi periodic and wherein the periodic regions and regions thereabout comprise voids and densification of the cladding material in the waveguide.

11. An optical waveguide as defined in claim 8 wherein stress induced regions are located approximately 2 to 5 microns from the core cladding interface.

12. An optical waveguide as defined in claim 8 wherein the stress induced regions are periodic or quasi-periodic.

13. An optical waveguide as defined in claim 8, wherein the stress pillars do not form a band around the entire cladding so that stress around the cladding in unequal due to the presence of the stress pillars.

14. An optical waveguide as defined in claim 8, wherein the waveguide is an optical fiber suitable for use in-situ in a high temperature environment, no greater than 1000° C. for sensing simultaneously temperature and mechanical related information, and further comprising a Bragg grating inscribed into the core thereof with short-pulsed electromagnetic radiation.

15. An optical waveguide as defined in claim 14 forming a part of a system comprising:
a light source for emitting a selected plurality of wavelengths of light, optically coupled to an end of the optical fiber, said light source for transmitting said light into said fiber;
a detector optically coupled with the Bragg grating for receiving reflected light from said Bragg grating; and,
means for analyzing a spectral response of said reflected light from said Bragg grating, wherein the system is a sensing system.

16. An optical waveguide as defined in claim 8 wherein the waveguide is an optical fiber comprising two Bragg gratings therein forming a resonator cavity and wherein the plurality of stress pillars are adjacent to one of the two Bragg gratings such that the such that the spectral response one of the Bragg gratings is birefringent, and wherein the optical fiber forms a fiber laser.

* * * * *